United States Patent [19]

Bersin et al.

[11] 4,364,413

[45] Dec. 21, 1982

[54] MOLAR GAS-FLOW CONTROLLER

[75] Inventors: Richard L. Bersin; William H. Clouser, both of Norwalk, Conn.

[73] Assignee: The Perkin-Elmer Corporation, Norwalk, Conn.

[21] Appl. No.: 223,197

[22] Filed: Jan. 7, 1981

[51] Int. Cl.³ .............................................. G01F 1/34
[52] U.S. Cl. .................................. 137/624.2; 73/223; 73/861; 222/3
[58] Field of Search ...................... 137/624.14, 624.18, 137/624.2; 73/149, 223, 861; 222/3

[56] References Cited

U.S. PATENT DOCUMENTS 3,115,038  12/1963  Babson ................................... 73/223
3,744,306  7/1973  Krueger ................................. 73/149
3,875,626  4/1975  Tyrk ................................... 73/223 X 4,285,245  8/1981  Kennedy ............................... 73/861

*Primary Examiner*—Alan Cohan
*Attorney, Agent, or Firm*—S. A. Giarratana; E. T. Grimes; T. P. Murphy

[57] ABSTRACT

An apparatus for controlling the volume of flow of a gas. A reference volume has an input conduit connected to the source of gas and an output conduit connected to a utilization device. Valves in the input and output conduits are cyclically controlled to permit pressure in the reference volume to reach a high and then to attain a low. The reference volume pressure is measured twice during each cycle to provide voltages representative of the high and low pressures. Circuit means control the time and duration of operation of the valves to cause the difference between the high and low pressures to equal a predetermined value.

9 Claims, 4 Drawing Figures

MOLAR GAS-FLOW CONTROLLER

BACKGROUND OF THE INVENTION

In many gas utilization systems the precise control of gas flow is essential. This is particularly true in the field of plasma etching of silicon wafers. Plasma etching also known as dry processing uses various types of gases such as carbon tetrachloride and chlorine to etch or remove unwanted materials from a silicon wafer which is being processed into integrated circuits. The type of gas used depends on the types of materials to be removed from the wafer as well as the type of etching desired, e.g., anistropic or isotropic. Often two or more etching gases are required to complete a single etching operation. The gases may be used in sequence or combined. The time of etching is critical to control the amount of material removed. Equally important is control of the flow of gases into the etching chamber so that precise control of volume of a gas in the etching chamber may be known. This enables an operator to maintain exact control of the amount of each gas used and where two or more gases are used control of the relative percentages thereof.

Typical gas flow controllers such as flowmeters are often inadequate to provide the precise gas flow control required in dry processing.

The present invention provides a gas flow controller of general utility but having particular utility in the field of dry processing of silicon wafers.

SUMMARY OF THE INVENTION

The present invention contemplates a gas flow control system which precisely controls average rates of gas flow.

The system comprises a reference volume having an input conduit connected to the source of gas and an output conduit connected to the utilization device. The input and output conduits each have a valve disposed therein. The input valve is opened for a predetermined time to permit the gas in the reference volume to reach a high pressure relative to a known reference. The input valve is then closed and the pressure in the reference volume is measured by a transducer. The output valve is then opened for a period of time and closed. The low pressure in the reference volume is then measured by the transducer. The opening and closing of each of the valves is carried out in a cyclic fashion with the high and low pressures being sampled once during each cycle. Electronic means determines the difference between the high and low pressures and compares this difference with a setpoint value. The open time of the outlet valve is controlled to maintain the difference between the high and low pressure values equal to the setpoint value.

DESCRIPTION

Figure 1:
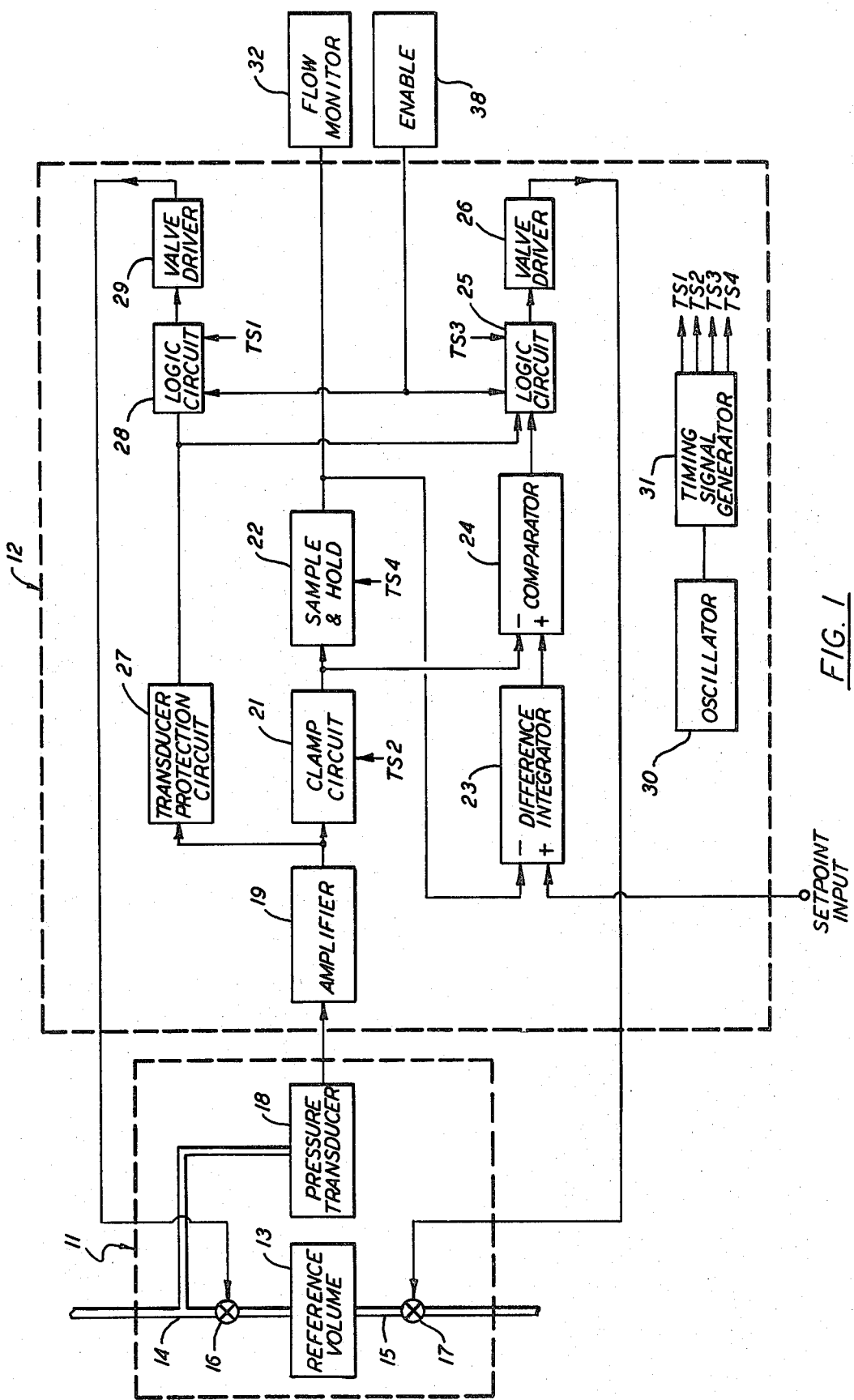
FIG. 1 is a block diagram of the present invention.

Referring now to FIG. 1 there is shown valve block 11 and control electronics 12.

A reference volume 13 is disposed in the gas supply line between a source of gas and a utilization device. The gas source and utilization devices are not shown inasmuch as they are not part of the present invention.

The reference volume 13 is of sufficient size to hold an adequate supply of gas whose pressure is to be sampled, e.g., 0.5 cc. It is connected to the gas source via input conduit 14 and the utilization device via output conduit 15. Input conduit 14 has a valve 16 disposed therein. Likewise, output conduit 15 has valve 17 disposed in it. The valves 16 and 17 may be of any conventional fast acting, solenoid type with appropriate orifice sizes.

A pressure transducer 18 communicates with reference volume 13. It also communicates with input conduit 14 above the valve 16. The pressure of the gas source in input conduit 14 acts as reference and the transducer senses the pressure differential between the source pressure and the pressure in the reference volume 13. Alternatively, instead of communicating with input conduit 14 the pressure transducer 18 may be connected to a reference pressure source (not shown). This is particularly desirable if the gas source pressure has a tendency to be unstable or if the gas is corrosive. The pressure transducer 18 is a silicon strain gauge type available from the Foxboro Company of Massachusetts. The pressure transducer 18 produces an output voltage proportional to the difference of pressure between the reference pressure and the pressure in the reference volume 13. The transducer is powered by a current source (not shown).

The output of transducer amplifier is connected to amplifier 19. The amplifier 19 is connected to clamp circuit 22. The combined action of the clamp circuit 21 and the sample-and-hold circuit 22 as will be explained below provides once in each cycle an output representative of the difference in pressure between the high and low pressure values sampled in reference volume 13.

The output of sample and hold circuit 22 is connected to the negative input terminal of difference integrator 23. The positive input terminal of difference integrator 23 receives an input representative of a set point value at which it is desired to maintain the output of sample and hold circuit 22. This as will be seen more clearly hereinafter, controls the average rate of flow of the gas to the utilization device.

The output of difference integrator 23 is connected to the positive input terminal of comparator 24. The output of clamp circuit 21 is connected to the negative input terminal of comparator 24. The comparator 24 provides a logic one (high) output if the positive input voltage is more positive than the negative input voltage and a logic zero (low) output if the positive input voltage is less positive than the negative input voltage.

The output of comparator 24 is connected to logic circuit 25 which in turn has its output connected to valve driver circuit 26. The valve driver circuit 26 is connected to valve 17. As aforesaid, valve 17 includes a solenoid which opens and closes valve 17 in response to appropriate outputs from the valve driver circuit 26.

The output of amplifier 19 is connected to transducer protection circuit 27 which in turn is connected to logic circuit 28. The output of logic circuit 28 is connected to valve driver circuit 29 which controls opening and closing of valve 16 in a manner similar to that of valve driver circuit 26. Transducer protection circuit 27 is also connected to logic circuit 25.

Figure 2:
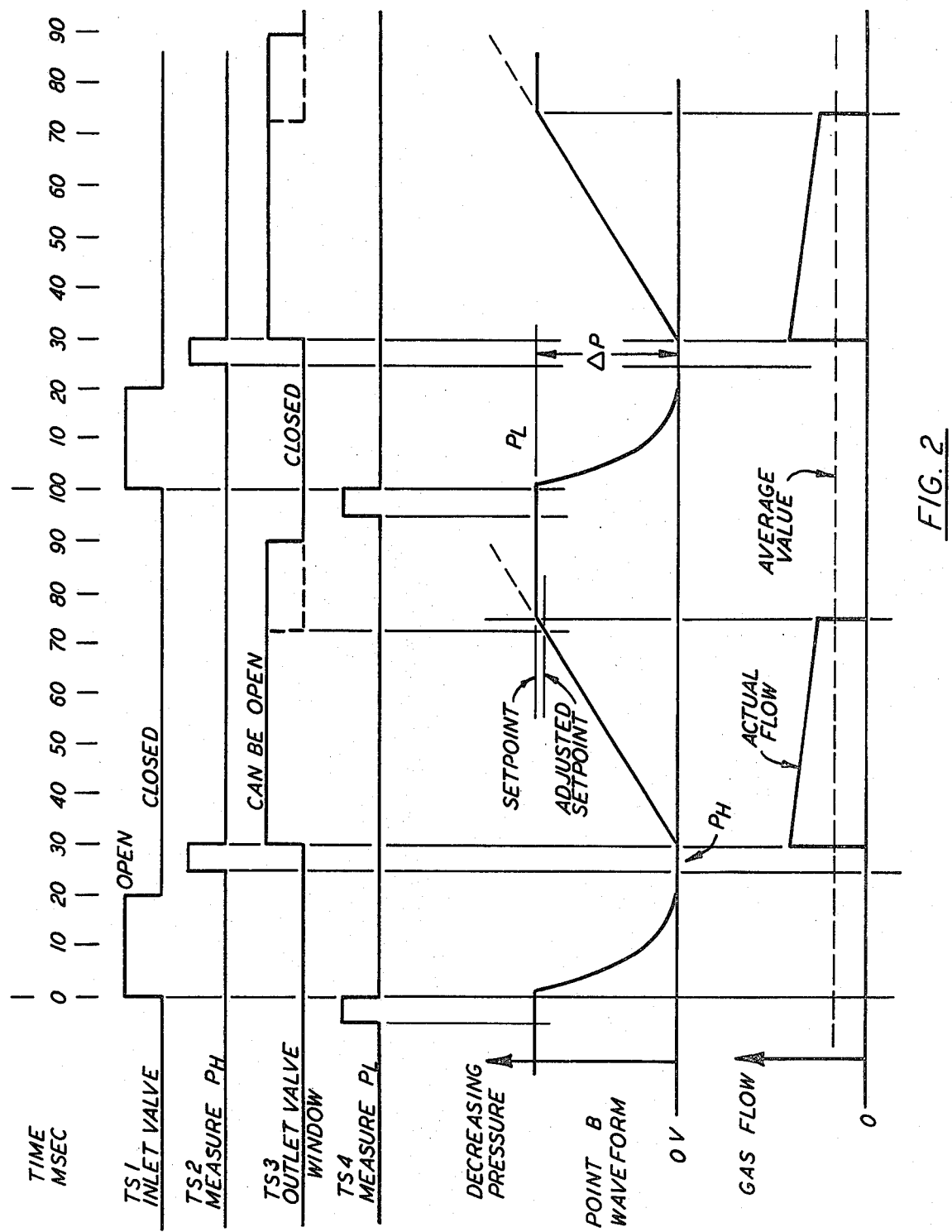
FIG. 2 is a timing diagram useful in explaining the present invention.

Also included in FIG. 1 is an oscillator 30 connected to timing signal generator 31. The timing signal generator 31 provides the cyclical pulses Ts1, Ts2, Ts3 and Ts4 whose time and duration of occurrence are seen in FIG. 2.

The pulse Ts1 is applied to logic circuit 28 which causes valve 16 to open each time pulse Ts1 occurs. Valve 16 remains open for the time interval that pulse Ts1 is in existence.

The pulse Ts3 is applied to logic circuit 25 which causes valve 17 to open for the duration of pulse Ts3 except, as will be explained below, when comparator 24 or transducer protection circuit 27 provides an output which overrides the pulse Ts3 and causes valve 17 to close before the end of Ts3. An inhibit signal may also be used to override operation of both valves 16 and 17.

The pulse Ts2 is applied to the clamp circuit 21. The clamp circuit 21 is conventional and comprises a resistance and capacitance in series. The output of the capacitance is connected to the ground through a normally open switch which closes in response to pulse Ts2. The output of the capacitor is also connected to the sample and hold circuit 22 via an amplifier (not shown). Thus, each time pulse Ts2 occurs the output voltage of the clamp circuit is connected to ground so that sample-and-hold circuit 22 sees zero volts for the duration of pulse Ts2.

The purpose of the clamp circuit 21 is to eliminate any d.c. offset voltage due to instability of the electronic components, e.g., amplifier 19 on transducer zero drift. Thus, when pulse Ts2 occurs after the reference volume has been allowed to reach a high pressure $P_H$ the voltage from transducer 18 is zero since the reference pressure and the pressure of the gas are equal. However, amplifier 19 may drift and have a voltage when its output should be zero volts. Thus, clamp circuit 21 is used to eliminate this voltage by clamping it to zero volts each time the high pressure $P_H$ in reference volume 13 is sampled by the occurrence of pulse Ts2.

The pulse Ts4 is applied to sample and hold circuit 22. Once each cycle the pulse Ts4 causes the output from clamp circuit 21 to be stored and provide the input to the monitor 32 and difference integrator 23.

The sample and hold circuit 22 is conventional and comprises a normally open switch and capacitor connected in series to the output of clamp circuit 21. It preferably includes an amplifier connected between the resistor and the flow monitor 32. A capacitance is connected between the resistor and ground so that each time pulse Ts4 occurs the capacitor stores the voltage from the clamp circuit 21 which at the time of pulse Ts4 is basically the voltage from amplifier 19.

The operation of the invention is now described using FIGS. 1 and 2. The pulses Ts1, TS2, Ts3, TS4 each occur once during a cycle which in a practical embodiment is 100 ms in duration.

During pulse Ts1 valve 16 is opened to permit gas from the source to enter reference volume 13. The valve opening of valve 16 is large enough to permit the pressure of the gas in reference volume 13 to rapidly equalize with the source pressure.

When pulse Ts1 ceases, the gas pressure in reference volume 13 is at its high $P_H$. The voltage output of transducer 18 is zero. As can be seen from the point B waveform in FIG. 2 voltage decreases as pressure in reference volume 13 increases. Thus, when pulse Ts2 occurs to sample the pressure $P_H$ in reference volume 13 the voltage, as shown, in FIG. 2 should be zero. If not, the clamping action of clamp circuit 21 causes it to be zero by eliminating any offset voltage caused by instability in the electronics.

During the occurrence of pulse Ts3 the valve 17 is opened allowing gas to escape via output conduit 15. As pressure decreases in reference volume 13 voltage on the output of amplifier 19 increases linearly as seen in curve B of FIG. 2. The time of duration of the pulse Ts3 is predetermined so that voltage output of amplifier 19 equals desired setpoint voltage, i.e., it is representative of the required low pressure $P_L$ to provide the desired gas flow.

This determination is made in accordance with equation:

$$M = kfV\Delta P$$

where:
M = mass flow in cubic centimeters per minute;
k = a constant;
f = frequency;
V = volume of reference volume 13;
$\Delta P = P_H - P_L$ = pressure change in the reference volume.

The frequency f in the practical embodiment being discussed is 10 Hz, as can be seen from FIG. 2. The volume of reference volume is 0.5 cc. $\Delta P$, which is the only variable in the equation, is changed by changing the open time of valve 17. P or $P_H - P_L$ then is the controlling factor in regulating gas flow. The duration of pulse Ts3 may be lengthened by changing the parameters in timing generator 32. However, once set, its duration may be shortened by logic circuit 25.

Referring again to FIG. 2 during the time that pulse Ts3 is in existence and valve 17 is opened pressure decreases and voltage increases. When pulse Ts3 ceases valve 17 closes and the pressure of the gas in the reference volume is at a low $P_L$ and remains there until pulse Ts1 reoccurs. This low pressure is sampled when pulse Ts4 occurs by sample and hold circuit 22 where the value is held until the next occurrence of pulse Ts4. Since the voltage representative of $P_H$ is zero, the output from sample and hold circuit 22 is $\Delta P$.

Difference integrator 23 has the function of adjusting the set point. This is necessary since the valve 17 cannot close instantly, i.e., it takes a millisecond or two for it to close. This would cause reference volume 13 to lose slightly more pressure than desired. Thus, difference integrator 23 adjusts the setpoint to cause valve 17 to close slightly sooner thereby maintaining $P_L$ at the desired level.

However, assuming valve 17 closed instantly and difference integrator 23 were unnecessary, then the output from clamp circuit 21 which is voltage B would be applied directly to comparator 24 as would the setpoint voltage. Thus, when voltage B became equal to the setpoint voltage logic circuit 25 receives a pulse to cause valve driver 26 to close valve 17 since the setpoint voltage was reached. The duration of pulse Ts3 is set longer than necessary and is overridden by the output from comparator 24.

Thus, by maintaining $\Delta P$ equal to the setpoint voltage gas flow M is controlled to be the desired amount. Since the cycle is repeated every 100 milliseconds, $\Delta P$ is continuously being updated. However, once the system reaches equilibrium, little correction is needed.

Since during each cycle gas flows only part of the time, the required gas flow is actually average flow as clearly seen in the gas flow curve in FIG. 2.

Since transducer 18 may be damaged if the pressure differential across it exceeds certain limits, transducer protection circuit is provided to provide an output to valve drivers 26 and 29 which overide all other inputs to cause valve 16 to open and valve 17 to close until pressure across the transducer is zero. This is explained more fully in reference to FIG. 4.

Figure 3:
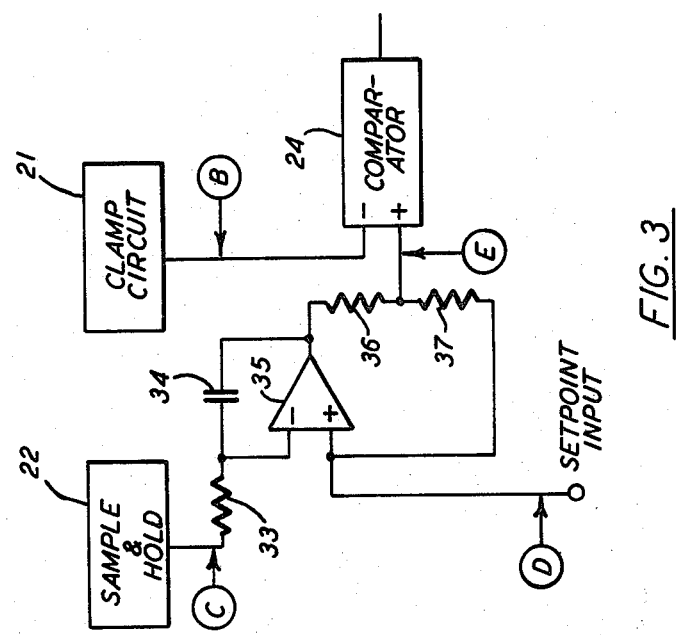
FIG. 3 is a schematic representation of the difference integrator of FIG. 1.

As aforesaid, since valve 17 cannot close instantaneously on command, reference volume 13 may exhaust more gas than desired. Thus, valve 17 is closed slightly sooner to offset this problem. Difference integrator 23 which provides the adjusted set point is shown in more detail in FIG. 3. The difference integrator 23 comprises a resistor 33 and capacitor 34 connected in series. One end of resistor 33 is connected to the output of sample and hold circuit 22. An operational amplifier 35 has its inverting input connected to the junction of resistor 33 and capacitor 34. The other end of capacitor 34 is connected to the output terminal of amplifier 35. The output of amplifier 35 is also connected to its non-inverting input via resistors 36 and 37. The junction of resistors 36 and 37 is connected to the non-inverting input of comparator 24. The setpoint voltage input is connected to the non-inverting input of amplifier 35.

The output of operational amplifier 35 is the setpoint voltage D plus a correction factor. The correction factor is a voltage proportional to the time integral of the error voltage. The error voltage is the setpoint voltage D minus the output voltage C of the sample and hold circuit 22. Therefore, as long as there is a difference between the voltage at points C and D, the voltage at point E, i.e., the corrected set point voltage is driven negative, causing voltage B to equal it earlier. This provides a signal to logic circuit 25 earlier than normally expected, thus causing valve 17 to close earlier, i.e., at the corrected set point to offset the effect of the slow closing valve 17. Once equilibrium is reached, the corrected set point remains constant, changing only if the closing time of the valve changes.

The outlet valve 17 should have an orifice size sufficiently small to allow gas to escape from the reference volume 13 at a controlled rate. Therefore, the average gas flow rate can be controlled by controlling the percentage of the time (duty cycle) that the outlet valve remains open.

Figure 4:
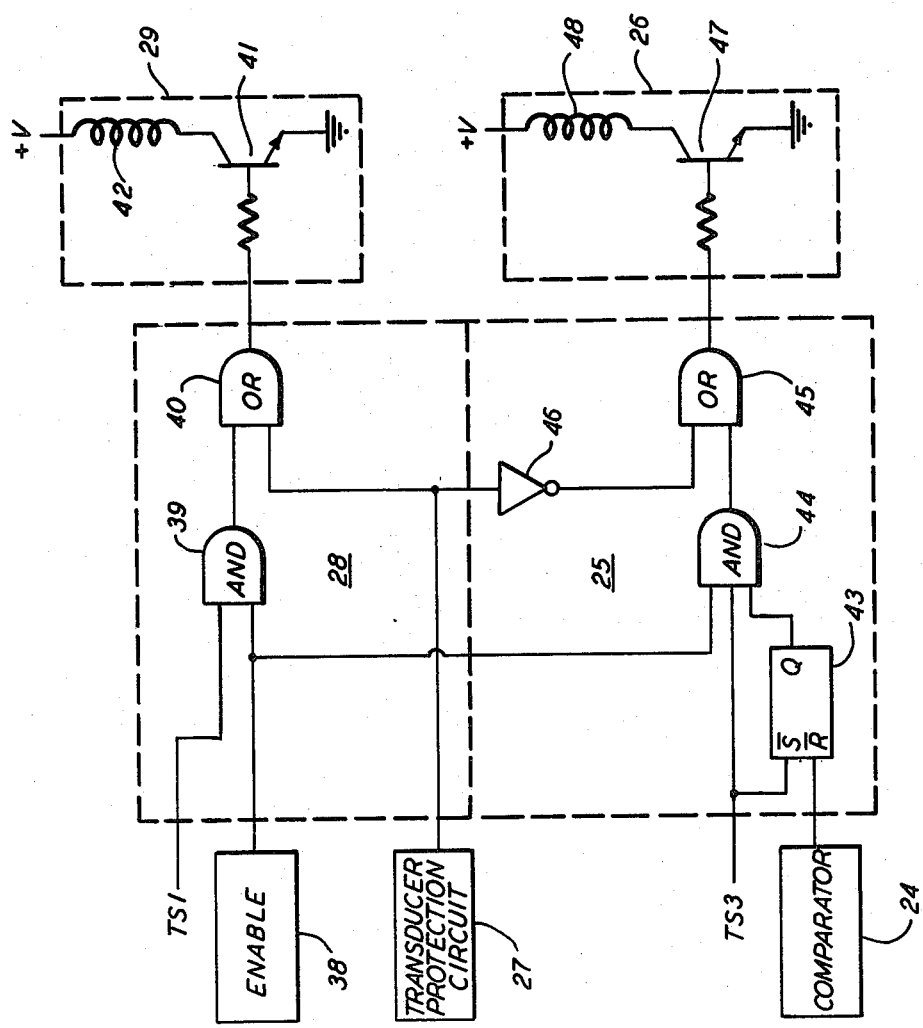
FIG. 4 is a schematic representation of the logic circuits of FIG. 1.

FIG. 4 is a schematic representation of the logic circuits 25 and 28 and the valve drivers 26 and 29.

Logic circuit 28 comprises an AND gate 39 having one input connected to receive pulse Ts1 and a second input connected to enable circuit 38. The output of AND gate 39 is connected to the input of OR gate 40 whose output is connected to the base of transistor 41. The transistor 41 is connected in series with coil 42 so that when an output pulse from the OR gate 40 is present transistor 41 becomes conductive to energize coil 29 which opens valve 16.

Logic circuit 25 comprises a flip-flop 43 having its reset input connected to comparator 24. An AND gate 44 has one input connected to enable circuit 38 and second input connected to the output of flip-flop 43. The third input to AND gate 44 comes from the Ts3 output of timing generator 31, which is also connected to the set input of flip-flop 43. The output of AND gate 44 is connected to one input of OR gate 45. OR gate 45 also is connected to receive a second input from transducer protection circuit 27 through inverter circuit 46. The output of OR gate 45 is connected to transistor 47, which is connected in series with coil 48. When transistor 47 is turned on by a signal from OR gate 45, coil 48 is energized to open valve 17.

During pulse Ts1 and when there is a high from enable circuit 38 to AND gate 39, transistor 41 is turned on energizing coil 29 to open valve 16.

Similarly, when AND gate 44 receives high inputs from all three of its inputs, i.e., from enable circuit 38, from flip-flop 43 and Ts3 transistor 47 is turned on energizing coil 48 to open valve 17.

The flip-flop 43 is held set during the time that pulse Ts3 is low, i.e., not existing. This causes flip-flop 43 to provide a high to AND gate 44. Thus, when pulse Ts3 occurs, AND gate 44 has the three necessary highs to turn on transistor 47. If nothing else happens, transistor 47 will be turned off when pulse Ts3 ceases. Normally, however, transistor 47 is turned off sooner. This is so because when comparator 24 senses that the required ΔP has been reached, its output becomes low, resetting flip-flop 43, thus taking away one of the three required high inputs to AND gate 44. Flip-flop 43 is again set by the trailing edge of the pulse Ts3 which also disables AND gate 44.

If the output from the enable circuit 38 goes low it can be seen that both valves 16 and 17 are closed because the AND gates each are missing a necessary high.

If pressure exceeds transducer tolerances, transducer protection circuit 27 produces a high which opens valve 16 and closes valve 17 thereby reducing the pressure across the transducer. This is a situation where the inputs to transistors 41 and 47 are overridden.

Other modifications of the present invention are possible in light of the above description which should not be construed as placing any limitation of the invention other than those set forth in the claims which follow.

What is claimed is:

1. An apparatus for controlling gas flow, comprising in combination, a reference volume having an input conduit and an output conduit,
   a source of gas connected to said input conduit,
   first and second normally closed valves disposed in said input and output conduits, respectively,
   control means for opening and closing said first and second valves to cause the difference between high and low pressures in said reference volume to equal a predetermined value,
   said control means comprising,
   transducer means connected to said reference volume and a reference pressure providing an output voltage representative of the pressure in said reference volume,
   generator means cyclically providing first, second, third and fourth pulses,
   first means responsive to said first pulse for opening said first valve for the duration of said first pulse, once each cycle,
   second means responsive to said third pulse for opening said second valve for the duration of said third pulse once each cycle,
   third means for closing said second valve when said output voltage equals a predetermined value.

2. An apparatus according to claim 1 wherein said transducer means includes, a transducer, an amplifier connected to said transducer.

3. An apparatus according to claim 2 wherein said third means includes, comparator means connected to said circuit means, to said second means and to a setpoint voltage providing an output to said second means to close said second valve when the output voltage from said amplifier equals said setpoint voltage.

4. An apparatus according to claim 2 including, circuit means connected to said amplifier providing an output voltage representative of the difference $\Delta P$ in gas pressure in said reference volume between the high pressure in said reference volume after the occurrence of said first pulse and the low pressure in said reference volume after the occurrence of said third pulse.

5. An apparatus according to claim 4 wherein said circuit means comprises, sample-and-hold circuit means responsive to said fourth pulse to store a voltage representative of said pressure difference once each cycle.

6. An apparatus according to claim 5 wherein said circuit means further includes, clamp circuit means connected between said amplifier and said sample-and-hold circuit means responsive to said second pulse to clamp said amplifier voltage to zero volts so that the voltage representative of said pressure difference $\Delta P$ is equal to the pressure stored in said sample-and-hold circuit.

7. An apparatus according to claims 3, 5 or 6 wherein said comparator means includes, a difference integrator connected to receive the output of said sample and hold circuit and said setpoint voltage as inputs for adjusting said setpoint voltage to a value to compensate for pressure loss in said reference volume due to inability of said second valve means to close instantaneously, a differential amplifier connected to said second means having an inverting input connected to said clamp circuit means and a non-inverting input connected to the output of said difference integrator for causing said second valve means to close slightly in advance than called for by the non-adjusted setpoint voltage to compensate for pressure loss due to the non-instantaneous closing of said second valve means.

8. An apparatus according to claim 7 further including, transducer protection means connected between said amplifier and said first and second means to cause said first valve means to open and said second valve means to close when the pressure across said transducer exceeds a predetermined amount.

9. An apparatus according to claim 8 further including, enable means connected to said first and second means for causing said first and second means to operate normally during the existence of a signal from said enable means and to shut down during the absence of said signal.

* * * * *